US010310262B2

(12) United States Patent
Ogasawara et al.

(10) Patent No.: US 10,310,262 B2
(45) Date of Patent: Jun. 4, 2019

(54) HEAD-UP DISPLAY DEVICE

(71) Applicant: NIPPON SEIKI CO., LTD., Niigata (JP)

(72) Inventors: Yukio Ogasawara, Niigata (JP); Yohei Sato, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/551,199

(22) PCT Filed: Feb. 8, 2016

(86) PCT No.: PCT/JP2016/053678
§ 371 (c)(1),
(2) Date: Aug. 15, 2017

(87) PCT Pub. No.: WO2016/132947
PCT Pub. Date: Aug. 25, 2016

(65) Prior Publication Data
US 2018/0031833 A1 Feb. 1, 2018

(30) Foreign Application Priority Data

Feb. 16, 2015 (JP) .................................. 2015-027397

(51) Int. Cl.
*G02B 27/01* (2006.01)
*B60K 35/00* (2006.01)
*B60K 37/04* (2006.01)

(52) U.S. Cl.
CPC .......... *G02B 27/0149* (2013.01); *B60K 35/00* (2013.01); *B60K 37/04* (2013.01);
(Continued)

(58) Field of Classification Search
CPC .. G02B 27/01; G02B 27/0101; G02B 27/0149; G02B 2027/0149; G02B 2027/0154
(Continued)

(56) References Cited

U.S. PATENT DOCUMENTS

2010/0046082 A1* 2/2010 Croy ..................... B60K 35/00
359/632
2014/0177064 A1 6/2014 Sugiyama et al.

FOREIGN PATENT DOCUMENTS

JP S62-200040 U 12/1987
JP 2013-159297 A 8/2013
(Continued)

OTHER PUBLICATIONS

International Search Report issued in Application No. PCT/JP2016/053678 dated Apr. 12, 2016, with English translation.

*Primary Examiner* — Stephone B Allen
*Assistant Examiner* — Travis S Fissel
(74) *Attorney, Agent, or Firm* — McDermott Will & Emery LLP (57) ABSTRACT

The problem addressed by the present invention is to provide a head-up display device suitable for a curved windshield in a head-up display device provided with a combiner and a cover wherein the cover moves in the longitudinal direction of the vehicle. A front part of a guide rail extending in the longitudinal direction of the vehicle is curved downward. A cover, which moves along this guide rail, is moved by a drive link and a driven link. Because the curved guide rail is used, the dimension of a head-up display device in the longitudinal direction of the vehicle can be reduced, a large inclined surface can be provided on the upper front part of a housing, and the head-up display device can be placed close to a curved windshield.

2 Claims, 9 Drawing Sheets

(52) U.S. Cl.
   CPC ......... *G02B 27/01* (2013.01); *G02B 27/0101* (2013.01); *B60K 2350/2052* (2013.01); *B60K 2350/405* (2013.01); *B60K 2350/921* (2013.01); *G02B 2027/0154* (2013.01)

(58) Field of Classification Search
   USPC ................. 359/630, 632; 348/115, 836, 841; 312/9.1–9.4, 9.6, 10.1, 26, 24, 30, 29
   See application file for complete search history.

(56) References Cited

FOREIGN PATENT DOCUMENTS

| WO | 2013/035813 A1 | 3/2013 |
| WO | 2014/163077 A1 | 10/2014 |

* cited by examiner

HEAD-UP DISPLAY DEVICE

RELATED APPLICATIONS

This application is the U.S. National Phase under 35 U.S.C. § 371 of International Application No. PCT/JP2016/053678, filed on Feb. 8, 2016, which in turn claims the benefit of Japanese Application No. 2015-027397, filed on Feb. 16, 2015, the disclosures of which are incorporated by reference herein.

TECHNICAL FIELD

The present invention relates to a head-up display device in which the dimension in the longitudinal direction of a vehicle is able to be reduced.

BACKGROUND ART

A driver of a vehicle drives while looking forward through a front windshield, and visually checking instruments on an instrument panel. That is, the gaze shifts forward and to the instruments below. If the instruments can be seen while looking forward, there will be no shift of gaze, so improved drivability can be expected. From this knowledge, head-up display devices have been developed and are being put into practical use (see Patent Literature 1 (FIG. 1 and FIG. 2), for example).

Figure 9:
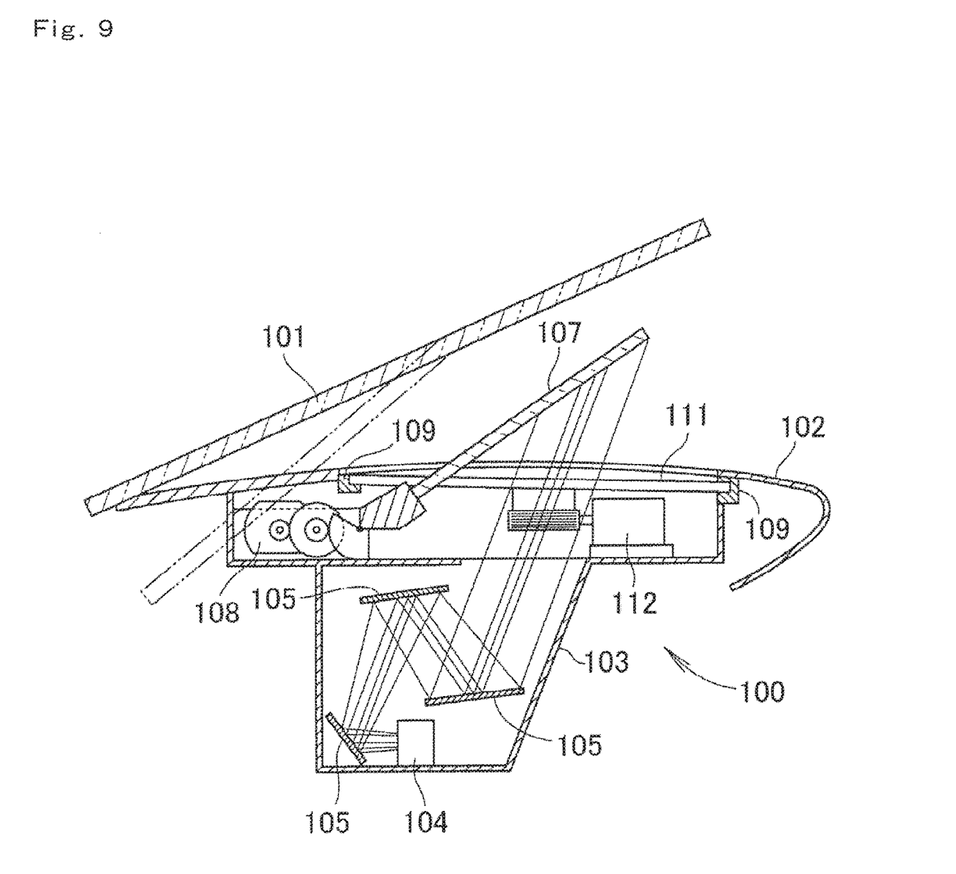
FIG. 9 is a sectional view of a conventional head-up display device.

FIG. 1 of Patent Literature 1 is reproduced. However, the reference numerals have been renumbered. A head-up display device 100 according to the related art shown in FIG. 9 is mounted on an upper surface of an instrument panel 102 of a vehicle that is positioned behind a front windshield 101. Light emitted from a display 104 stored in a case 103 is first reflected by three reflectors 105, and then emitted upward from the case 103 and illuminated toward a translucent reflector 107.

The translucent reflector 107 has two functions, i.e., a reflective function and a translucent function, and is therefore typically referred to as a combiner (multifunction device). Hereinafter, the translucent reflector 107 will be referred to as combiner 107.

The combiner 107 is stored in the case 103 so as to be out of the way, when not in use. More specifically, the combiner 107 is placed in a horizontal state from an upright state by a combiner tilting mechanism 108, and then a cover 111 that is supported by guide rails 109, 109 that extend in the front-back direction of the drawing is moved in the front-back direction of the drawing (FIG. 2 of Patent Literature 1) by a cover moving mechanism 112. As a result, the combiner 107 that is in the stored state is covered by the cover 111.

Because the cover 111 moves in the vehicle width direction (the front-back direction in FIG. 9), a space in the vehicle width direction that is more than two times the width of the cover 111 is occupied. As a result, the degree of freedom of arrangement of equipment arranged inside the instrument panel 101 is reduced.

As a countermeasure, it is conceivable to move the cover 111 in the longitudinal direction of the vehicle. If an attempt is made to move the cover 111 in the longitudinal direction of the vehicle, the dimension of the head-up display device 100 in the longitudinal direction of the vehicle will inevitably become long. As a result, the vehicle cabin volume will be affected.

Also, in recent years, the number of vehicles in which curved glass is employed for the front windshield 101 to enhance the design has increased. As shown by the imaginary line in FIG. 9, if a lower part of the front windshield 101 is made to curve downward, the curved glass will interfere with a front part of the head-up display device 100. However, from the viewpoint of design, a structure that is better suited for curved glass is needed.

That is, in a head-up display device that is provided with the combiner 107 and the cover 111, and in which the cover 111 moves in the longitudinal direction of the vehicle, a head-up display device that is compatible with a curved front windshield is needed.

CITATION LIST

Patent Literature

Patent Literature 1: Japanese Utility Model Application Publication No. 62-200040

SUMMARY OF THE INVENTION

Problems to be Solved by the Invention

The present invention provides a head-up display device that is compatible with a curved front windshield, in a head-up display device that is provided with a combiner and a cover, and in which the cover moves in the longitudinal direction of a vehicle.

Means for Solving the Problem

In the present invention according to claim 1, a head-up display device that includes: a display that emits, as display light, information to be displayed; a combiner that reflects the display light emitted from the display toward a user of a vehicle; a casing that has an opening in an upper part and stores the display and the combiner; a combiner tilting mechanism that is provided inside the casing, and tilts the combiner such that the combiner that is substantially horizontal when stored stands up and protrudes from the opening when in use, a cover that closes off the opening when the combiner is in a stored state; and a cover opening and closing mechanism that reciprocally moves the cover that is in a closed position to an open position, wherein the cover opening and closing mechanism includes: left and right guide rails that have a horizontal guiding part that is substantially horizontal and a curved guiding part that is connected to a front of the horizontal guiding part and extends forward and downward with respect to the vehicle; cover moving means for moving the cover, and the cover is guided by the guide rails.

In the present invention according to claim 2, the cover moving means includes; a driven link that is swingably connected to a front part of the cover: a drive link that is connected to the driven link: and a link drive source that swings the drive link.

Effect of the Invention

With the invention according to claim 1, the cover is moved along guide rails, and the guide rails have a horizontal guiding part that is substantially horizontal and a curved guiding part that is connected to a front of the horizontal guiding part and extends forward and downward with respect to the vehicle. A lower part of a front windshield is able to be curved following this curved guiding part. That is, according to the present invention, a head-up display device that is compatible with a curved front windshield is provided, even with a head-up display device that is provided with a combiner and a cover, and in which the cover moves in the longitudinal direction of the vehicle.

With the invention according to claim 2, cover moving means is formed by a driven link, a drive link, and a link drive source. The driven link and the drive link are rod-shaped members that have a simple shape and are lightweight. Accordingly, the cover is able to be opened and closed by simple means, while reducing the weight of the head-up display device.

MODE FOR CARRYING OUT THE INVENTION

An embodiment of the present invention will be described with reference to the accompanying drawings.

Embodiment

Figure 1:
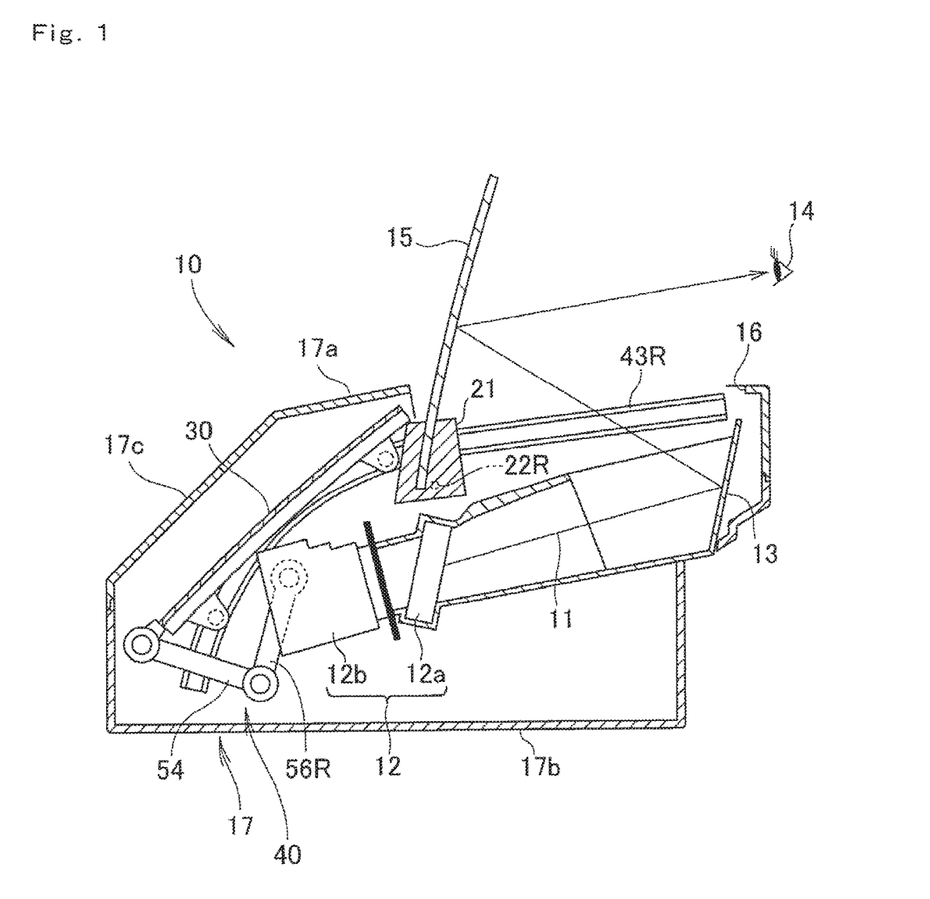
FIG. 1 is a sectional view of a head-up display device.

As shown in FIG. 1, a head-up display device 10 includes a display 12 that emits, as display light 11, information to be displayed, a reflector 13 that reflects the display light 11 emitted from the display 12, a combiner 15 that reflects the reflected light toward a user (for example, a driver) 14 of a vehicle, a casing 17 that has an opening 16 in an upper part and stores the display 12 and the combiner 15, a combiner tilting mechanism (reference numeral 20 in FIG. 2) that is provided inside the casing 17 and moves the combiner 15 to make the combiner 15 that is substantially horizontal when stored stand up and protrude from the opening 16 when in use, a cover 30 that closes off the opening 16 when the combiner 15 is in a stored state, and a cover opening and closing mechanism 40 that moves the cover 30 that is in a closed position to an open position.

The display 12 includes a liquid crystal display panel 12a and a backlight unit 12b. The liquid crystal display panel 12a receives light from the backlight unit 12b and emits the display light 11. Incidentally, the backlight unit 12b is formed by, for example, a light source formed by an LED that emits light, and a plurality of optical members such as lenses arranged between this light source and the liquid crystal display panel 12a.

The combiner 15 is formed as a rectangular circular-arc curved plate, and is arranged in a position in which the display light 11 that is emitted from the display 12 and reflected by the reflector 13 is further reflected toward the user 14 of the vehicle.

The casing 17 includes an upper case 17a that is made of resin, and a lower case 17b that interlocks with the upper case 17a. The upper case 17a is provided with the opening 16 on an upper surface, and also has a large inclined surface 17c at a portion (a front upper part) where the upper surface and a front surface meet. The inclined surface 17c is formed almost parallel to the cover 30 when the cover 30 is stored.

Figure 2:
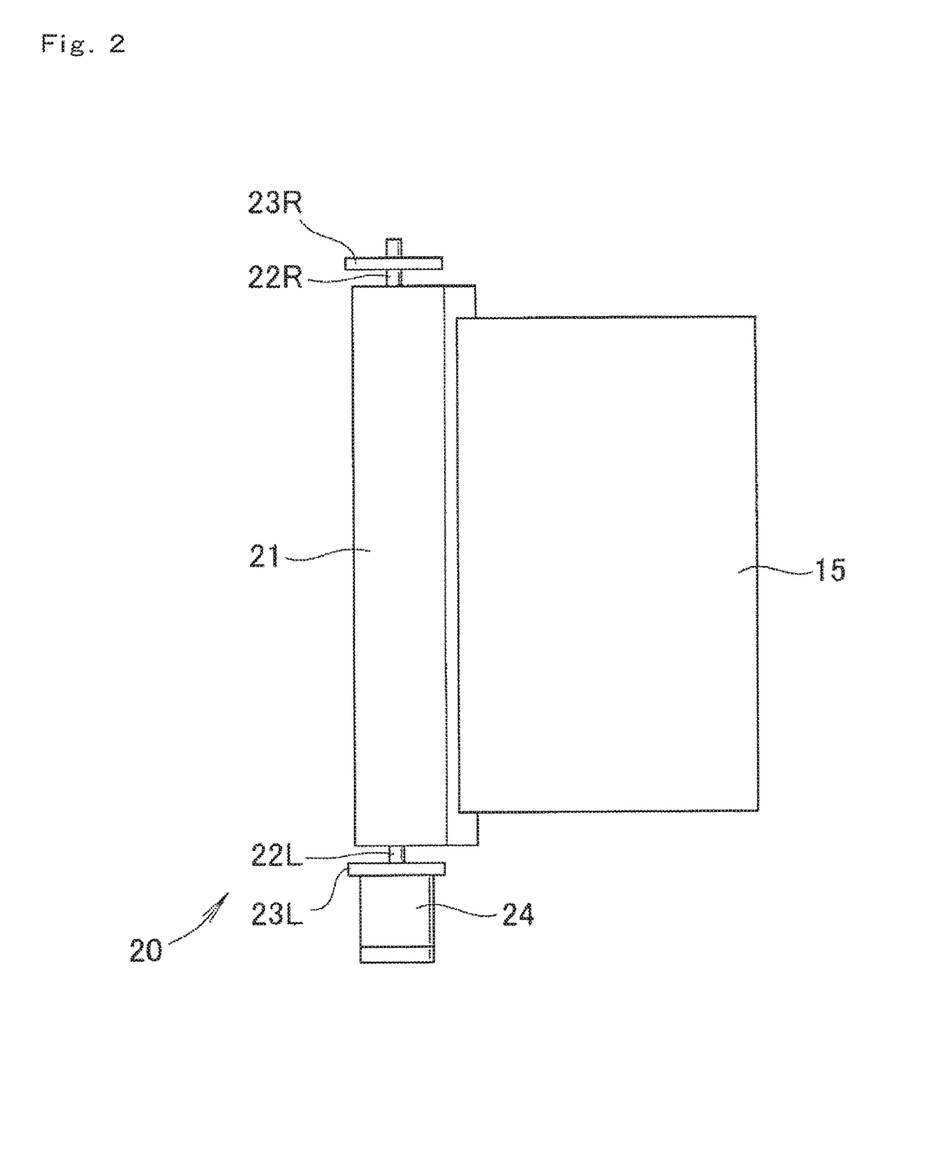
FIG. 2 is a plan view of a combiner.

As shown in FIG. 2, the combiner 15 that is a rectangular circular-arc curved plate is supported at a lower end edge by a holder 21. The combiner tilting mechanism 20 includes the holder 21, shafts 22L, 22R (L is appended to the element that is to the left, and R is appended to the element that is to the right, of the user 14 of the vehicle shown in FIG. 1; the same applies hereinafter) that extend from left and right ends of this holder 21, stays 23L, 23R that rotatably support these shafts 22L, 22R, respectively, and a rotary actuator 24 that is mounted to one of the stays 23L and rotates one of the shafts 22L.

Figure 3:
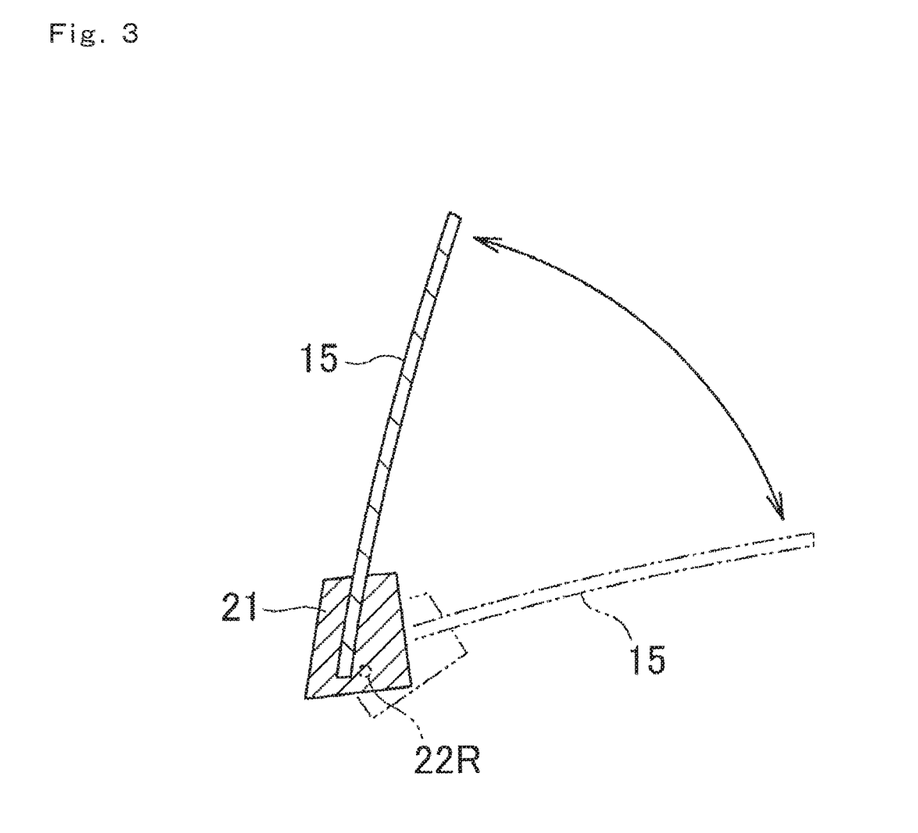
FIG. 3 is an operational view of the combiner.

The type and form of the rotary actuator 24 are arbitrary. The rotary actuator 24 may be formed by a motor, a worm, and a wheel. The stays 23L, 23R are members that extend from the casing 17. As shown in FIG. 3, the combiner 15 is tilted from an upright state shown by the solid line to a substantially horizontal state shown by the imaginary line. The upright state is an in-use state, and the substantially horizontal state is a not-in-use (unused) state.

Figure 4:
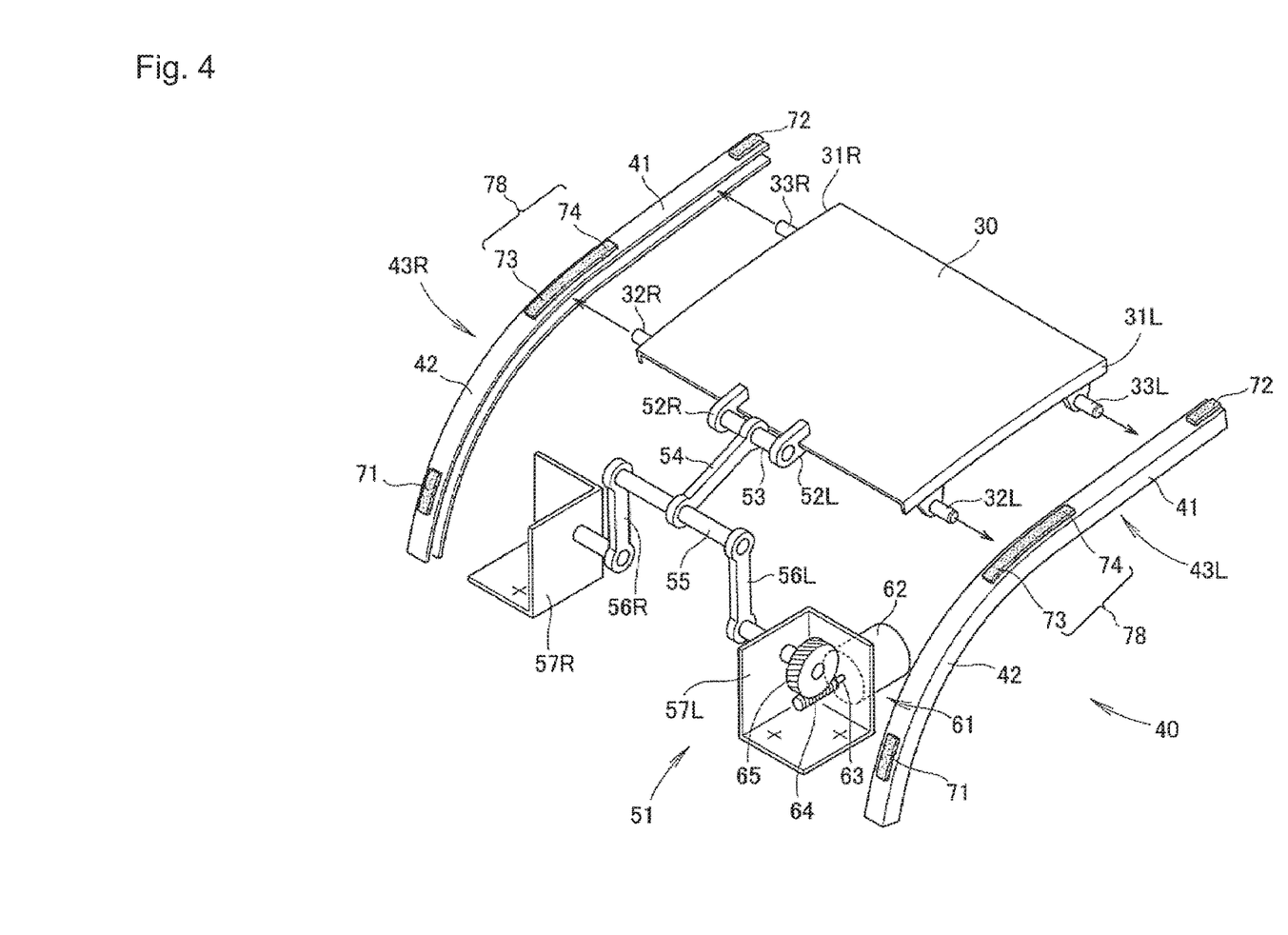
FIG. 4 is an exploded perspective view of a cover opening and closing mechanism.

As shown in FIG. 4, the cover 30 is a rectangular plate and is made of resin or light metal, and is provided with a left front protruding part 32L and a left rear protruding part 33L that protrude toward the left on a left side face 31L at the front and rear, respectively, and is provided with a right front protruding part 32R and a right rear protruding part 33R that protrude toward the right on a right side face 31R at the front and rear, respectively.

For the protruding parts 32L to 33R, round bar that extends horizontally is suitable, but a structure in which shafts extend horizontally and rollers are rotatably mounted to the shafts may also be adopted. However, round bar has a simple structure and thus enables costs to be kept down.

The cover opening and closing mechanism 40 includes left and right guide rails 43L, 43R that have horizontal guiding parts 41 that are substantially horizontal and curved guiding parts 42 that are connected to the fronts of these horizontal guiding parts 41 and extend forward and downward with respect to the vehicle, and cover moving means 51 for moving the cover 30.

The cover moving means 51 includes, for example, a pair of plates 52L, 52R mounted to a front edge of the cover 30, a shaft 53 that passes through these plates 52L, 52R, a driven link 54 that is connected to the center of this shaft 53, a horizontally long shaft 55 that passes through a tip end of this driven link 54, drive links 56L, 56R that are connected to both ends of this horizontally long shaft 55, left and right brackets 57L, 57R that swingably support these drive links 56L, 56R, and a link drive source 61 that swings one of the drive links 56L. The brackets 57L, 57R are members that extend from the casing 17.

The type and form of the link drive source 61 do not matter as long as the link drive source 61 is a rotary actuator. For example, the link drive source 61 is formed by a servo motor 62 mounted to one of the brackets 57L, a worm 64 mounted to a motor shaft 63 of this servo motor 62, and a wheel 65 that meshes with this worm 64 and is connected to the drive link 56L.

The worm 64 and the wheel 65 exhibit a self-locking (self-braking) action. That is, because of the self-lock, there is no worry of the motor shaft 63 being rotated from the cover 30 side. Therefore, there is no need to specially provide a brake on the servo motor 62 or the motor shaft 63.

Figure 5:
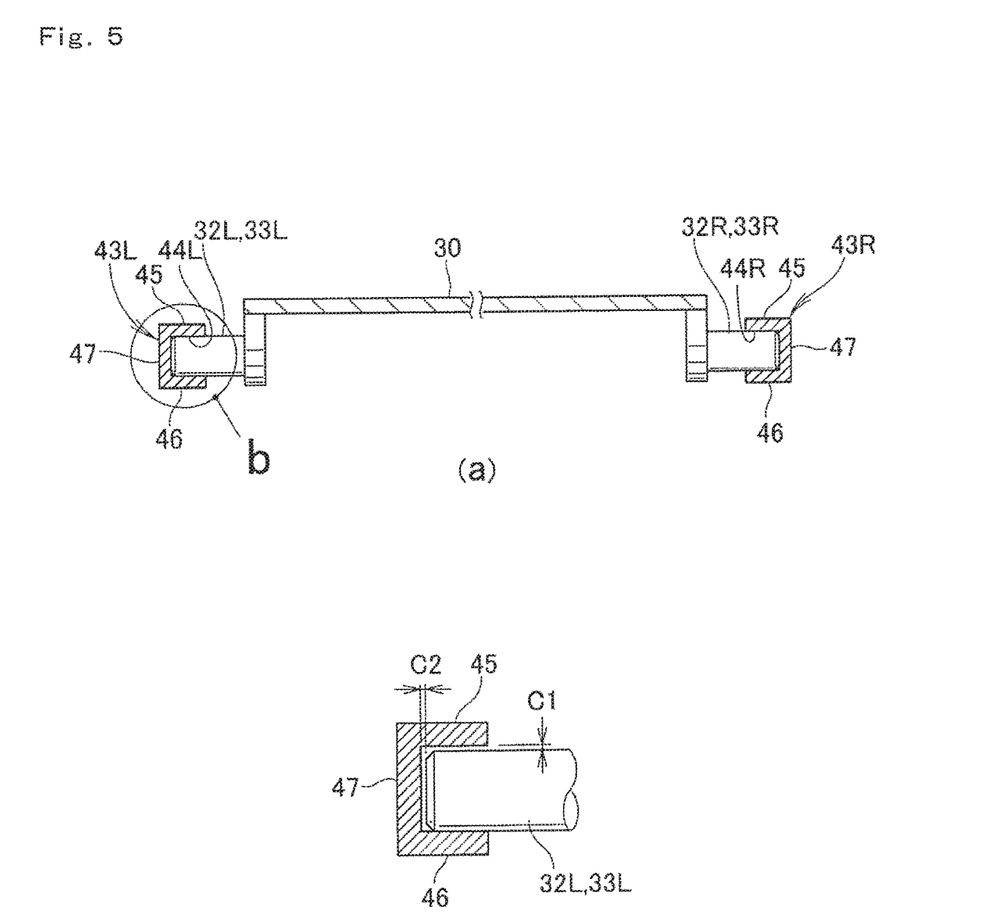
FIG. 5 is a transverse sectional view of the cover and guide rails.

As shown in FIG. 5 (a), the left guide rail 43L has a U-shaped groove 44L that accommodates the protruding parts 32L, 33L. The right guide rail 43R also has a U-shaped groove 44R that accommodates the protruding parts 32R, 33R. The U-shaped grooves 44L, 44R are formed by an upper flange 45, a lower flange 46, and a web 47 that is a connecting part that connects both of the flanges 45, 46.

As shown in FIG. 5 (b) that is an enlarged view of part b in FIG. 5 (a), the protruding parts 32L, 33L are on the lower flange 46, and a small clearance C1 is ensured between the protruding parts 32L, 33L and the upper flange 45, and a small clearance C2 is also ensured between the protruding parts 32L, 33L and the web 47. These clearances C1, C2 enable the protruding parts 32L, 33L to move smoothly in the front-back direction of the drawing. If the clearances C1, C2 are zero or are insufficient, a biting phenomenon or a rubbing phenomenon will occur, and movement will be poor.

If the protruding parts 32L, 33L are moved at a constant speed and then an attempt is made to stop them, inertia force will be applied. It is thought that the inertia force will cause the protruding parts 32L, 33L to strike the upper flange 45, in particular, and an abnormal noise will be produced at this time. If the moving speed is slow, the inertia force will be small so the abnormal noise will also be small, but as the moving speed becomes faster, the inertia force will increase and the abnormal noise will increase. As a countermeasure, an elastic body of rubber or the like that absorbs inertia energy is installed on the guide rails 43L, 43R.

The elastic body includes first to fourth elastic bodies 71 to 74 that are installed on each of the guide rails 43L, 43R. Of these first to fourth elastic bodies 71 to 74, the first elastic body 71 (hereinafter, simply referred to as elastic body 71) will be taken as a representative example, and the structure and installation procedure thereof will be described next.

Figure 6:
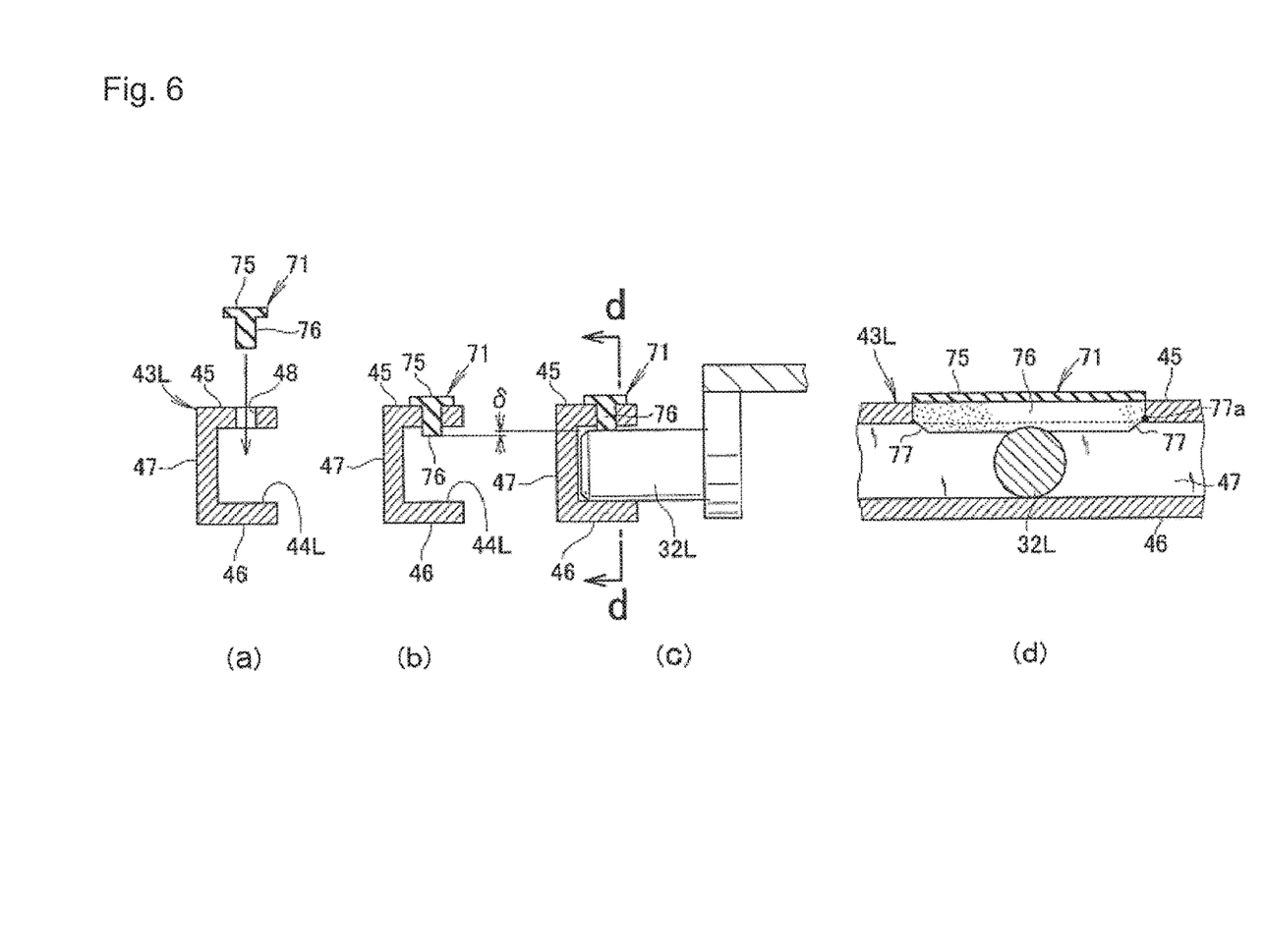
FIG. 6 is a view explaining a procedure for installing an elastic body.

As shown in FIG. 6 (a), a long hole-shaped through-hole 48 that extends in the front-back direction of the drawing is provided in the upper flange 45. Also, the elastic body 71 that has a T-shaped cross section and is formed by a horizontal part 75 and a leg part (a tip end part) 76 that extends at a right angle from the center of this horizontal part 75, is prepared. The leg part 76 is made a length determined taking into account the thickness and shrinkage allowance of the upper flange 45.

As shown in FIG. 6 (b), the leg part 76 is pressed into the through-hole 48 such that a lower surface of the horizontal part 75 strikes an upper surface of the upper flange 45. The elastic body 71 is installed on the U-shaped groove 44L, i.e., the guide rail 43L, by the procedure described above. Incidentally, aside from being fixed by just interlocking, the elastic body 71 may also be fixed by adhesion or baking.

As shown in FIG. 6 (c), the leg part 76 is compressed by the protruding part 32L by δ. As shown in FIG. 6 (d) that is a sectional view taken along line d-d in FIG. 6 (c), the elastic body 71 has a tapered surface 77 on at least one end such that the protruding part 32L that moves in the left-right direction in the drawing starts to smoothly bite into the elastic body 71. Preferably, a starting point 77a of the tapered surface 77 is within the plate thickness of the upper flange 45, as shown in the drawings.

Figure 7:
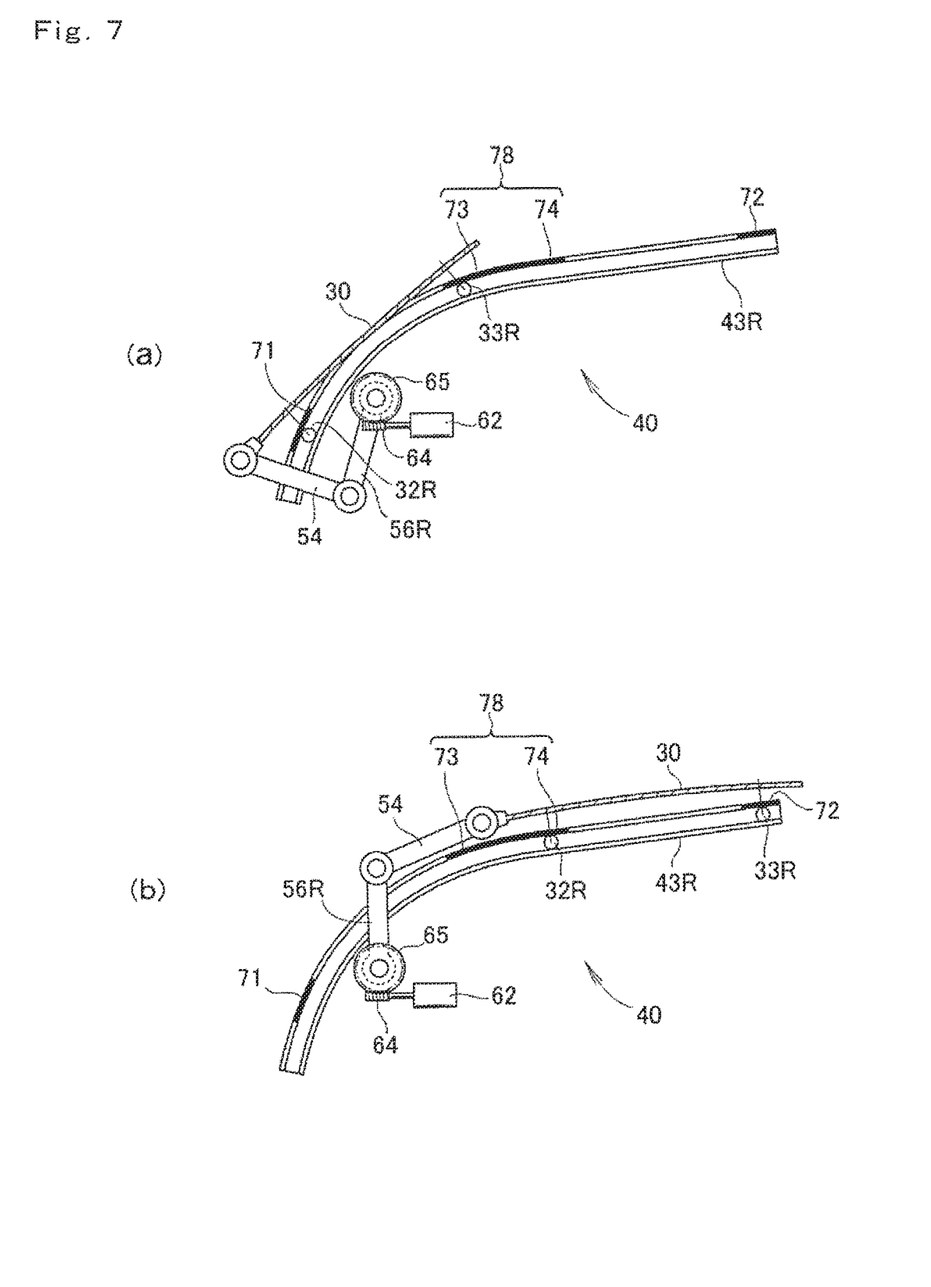
FIG. 7 is an operational view of the cover opening and closing mechanism.

FIG. 7 (a) is a view illustrating the cover 30 and the cover opening and closing mechanism 40 extracted from FIG. 1, in which, when the first to fourth elastic bodies 71 to 74 are installed on the guide rail 43R and the cover 30 is in an open position, the front protruding part 32R is interlocked with the first elastic body 71, and the rear protruding part 33R is interlocked with the third elastic body 73.

When the worm 64 is rotated by the servo motor 62, and the wheel 65 is rotated by this worm 64, the drive link 56R swings clockwise in the drawing, and the cover 30 starts to move in the closing direction via the driven link 54. As shown in FIG. 7 (b), when the cover 30 reaches the closed position, the servo motor 62 stops. When the cover 30 is in the closed position, the front protruding part 32R is interlocked with the fourth elastic body 74, and the rear protruding part 33R is interlocked with the second elastic body 72.

Figure 8:
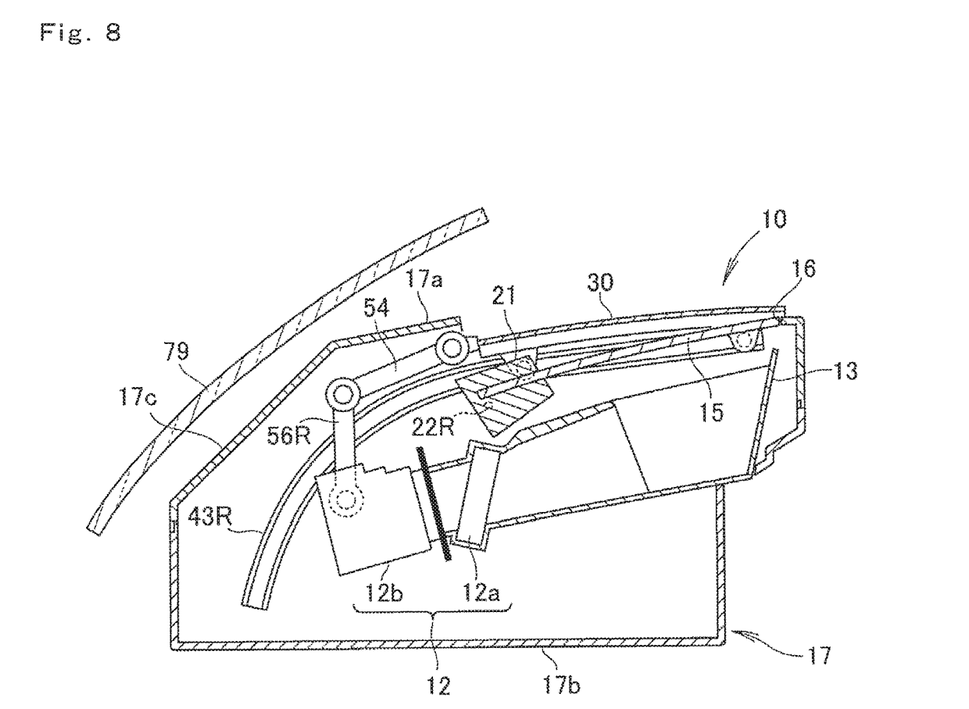
FIG. 8 is a sectional view of the head-up display device when the combiner is stored.

As a result, the opening 16 is able to be closed off by the cover 30 after the combiner 15 is stored substantially horizontally in the casing 17, as shown in FIG. 8. Because the opening 16 is closed off with the cover 30, there is no longer a concern that external light such as sunlight will enter the casing 17, and no longer a concern that dust will enter the casing 17. Furthermore, the head-up display device 10 is able to be arranged near a curved front windshield 79.

When the servo motor 62 is rotated in the reverse direction in FIG. 7 (b), the state returns to the state in FIG. 7 (a). FIG. 7 (a) shows when the cover is open. When the cover is open, the front protruding part 32R is elastically restrained by the first elastic body 71, so the inertia energy at the time of stopping is absorbed by the first elastic body 71, and the generation of abnormal noise is inhibited. Also, FIG. 7 (b) shows when the cover is closed. When the cover is closed, the rear protruding part 33R is elastically restrained by the second elastic body 72, so the inertia energy at the time of stopping is absorbed by the second elastic body 72, and the generation of abnormal noise is inhibited.

The generation of abnormal noise is able to be even more effectively inhibited by the third elastic body 73 and the fourth elastic body 74. In this embodiment, the third elastic body 73 and the fourth elastic body 74 are close together, and thus are integrally formed into an intermediate elastic body 78 so as to be one single joined piece. The number of parts is able to be reduced, and the number of man-hours for installing the elastic bodies is also able to be reduced, compared to when the third elastic body 73 and the fourth elastic body 74 are prepared individually. However, the third elastic body 73 and the fourth elastic body 74 may also be separate.

Incidentally, the elastic bodies 71 to 74 are provided on the upper flange 45 in this embodiment, but the elastic bodies 71 to 74 may be provided on the lower flange 46, or on both the upper and lower flanges 45, 46.

Also, the elastic bodies 71 to 74 may also be such that strip-shaped elastic bodies are affixed to an inside surface of the upper flange 45. However, the width of the U-shaped grooves 44L, 44R are small, so affixing would be difficult. In this regard, with the structure shown in FIG. 6, installation from the outside is possible. In addition, with the structure shown in FIG. 6, there is the advantage of being able to visually confirm from the outside whether there are any installation omissions.

INDUSTRIAL APPLICABILITY

The present invention is suitable as a head-up display device that is provided with a combiner and a cover, in which the cover moves in the longitudinal direction of a vehicle.

DESCRIPTION OF REFERENCE NUMERALS

10 . . . Head-up display device
11 . . . Display light
12 . . . Display

14 . . . User of vehicle
15 . . . Combiner
16 . . . Opening
17 . . . Casing
30 . . . Cover
31L . . . Left side face of cover
31R . . . Right side face of cover
32L . . . Front protruding part (left, front protruding part)
32R . . . Front protruding part (right front protruding part)
33L . . . Rear protruding part (left rear protruding part)
33R . . . Rear protruding part (right rear protruding part)
40 . . . Cover opening and closing mechanism
41 . . . Horizontal guiding part of guide rail
42 . . . Curved guiding part of guide rail
43L . . . Guide rail (left guide rail)
43R . . . Guide rail (right guide rail)
44L . . . U-shaped groove (left U-shaped groove)
44R . . . U-shaped groove (right U-shaped groove)
45 . . . Upper flange
46 . . . Lower flange
48 . . . Through-hole
51 . . . Cover moving means
54 . . . Driven link
56L, 56R . . . Drive links
61 . . . Link drive source
71 . . . First elastic body
72 . . . Second elastic body
73 . . . Third elastic body
74 . . . Fourth elastic body
79 . . . Front windshield

The invention claimed is:

1. A head-up display device comprising:
a display that emits display light as information to be displayed;
a combiner that reflects the display light emitted from the display toward a user of a vehicle;
a casing that has an opening in an upper part of the casing and stores the display and the combiner;
a combiner tilting mechanism that is provided inside the casing, and moves the combiner between a first position and a second position, wherein when the combiner is in the first position, the combiner protrudes from the opening of the casing, wherein when the combiner is in the second position, the entirety of the combiner is stored within the casing;
a cover that closes off the opening when the combiner is in the second position; and
a cover opening and closing mechanism that moves the cover between a closed position and an open position, wherein the cover closes off the opening of the casing when the cover is in the closed position, wherein the cover is removed from the opening when the cover is in the open position,
wherein the cover opening and closing mechanism includes:
left and right guide rails each having a horizontal guiding part that is substantially parallel with respect to a surface of an instrumental panel of the vehicle and a curved guiding part that extends from one end of the horizontal guiding part toward in a curvature a bottom surface of the casing; and
cover moving mechanism for moving the cover, wherein the movement of the cover is guided by the guide rails, wherein the cover moving mechanism comprises:
a driven link that is swingably connected to a first side of the cover, wherein the first side is opposite a second side of the cover, wherein the second side of the cover is disposed closer to the combiner than the first side of the cover when the cover is in the open position;
a drive link that extends between the driven link and a link drive source; and
the link drive source that drives the driven link and the drive link to move the cover between the open position and the closed position,
wherein the left guide rail comprises a left side U-shaped groove that accommodates a left side protruding part formed on the cover, and
wherein the right guide rail comprises a right side U-shaped groove that accommodates a right side protruding part formed on the cover.

2. A head-up display device comprising:
a casing that comprises an opening, the casing housing:
a display that emits display light as information to be displayed;
a combiner configured to be in a first position and a second position, wherein the combiner reflects the display light emitted from the display when the combiner is in the first position;
a combiner tilting mechanism that moves the combiner between the first position and the second position through the opening of the casing, wherein when the combiner is in the first position, at least a part of the combiner is disposed outside the casing, wherein when the combiner is in the second position, the entirety of the combiner is disposed within the casing;
a cover configured to be in an open position and a closed position, wherein the cover comprises 1) a first side, 2) a second side opposite the first side, 3) a third side extending between the first side and the second side, and 4) a fourth side opposite the third side and extending between the first side and the second side, wherein when the combiner is in the first position, 1) the cover is in the open position and 2) the first side of the cover is closer to the combiner than the second side of the cover, wherein when the combiner is in the second position, the cover is in the closed position; and
a cover opening and closing mechanism that moves the cover between the open position and the closed position, wherein the cover opening and closing mechanism comprises:
a first guide rail and a second guide rail, wherein the first guide rail is parallel to the second guide rail, wherein the first guide rail comprises a first groove that accommodates a first protruding part of the third side of the cover, wherein the second guide rail comprises a second groove that accommodates a second protruding part of the fourth side of the cover;
a link extending between the second side of the cover and a link drive source; and
the link drive source that drives the link to move the cover between the open position and the closed position.

* * * * *